United States Patent
Ishibashi

(10) Patent No.: US 6,778,537 B1
(45) Date of Patent: Aug. 17, 2004

(54) DATA PROCESSING SYSTEM AND TIME STAMP CREATING METHOD

(75) Inventor: Yasuhiro Ishibashi, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 830 days.

(21) Appl. No.: 09/617,235

(22) Filed: Jul. 14, 2000

(30) Foreign Application Priority Data

Jul. 15, 1999 (JP) .......................................... 11-201969

(51) Int. Cl.⁷ ............................................ H04L 12/56
(52) U.S. Cl. ................. 370/395.62; 370/394; 370/421; 370/509; 370/519
(58) Field of Search ................................ 370/518–522, 370/503, 508, 509–510, 389, 257, 44, 468, 355, 248, 358, 253, 394, 395.62; 709/253, 248; 375/355, 358

(56) References Cited

U.S. PATENT DOCUMENTS

| | | | | |
|---|---|---|---|---|
| 5,052,029 A | | 9/1991 | James et al. ................. 375/107 |
| 5,394,556 A | | 2/1995 | Oprescu ..................... 395/800 |
| 5,822,317 A | * | 10/1998 | Shibata .................. 370/395.62 |
| 6,038,230 A | * | 3/2000 | Ofek .......................... 370/389 |
| 6,072,809 A | * | 6/2000 | Agrawal et al. ............. 370/503 |
| 6,104,724 A | * | 8/2000 | Upp ........................... 307/458 |
| 6,252,891 B1 | * | 6/2001 | Perches ....................... 370/503 |
| 6,330,236 B1 | * | 12/2001 | Ofek et al. .................. 370/369 |
| 6,351,471 B1 | * | 2/2002 | Robinett et al. ............ 370/468 |
| 6,373,821 B2 | * | 4/2002 | Staats ......................... 370/252 |
| 6,389,019 B1 | * | 5/2002 | Fan et al. .............. 370/395.42 |
| 6,414,971 B1 | * | 7/2002 | James et al. ................ 370/519 |
| 6,580,869 B1 | * | 6/2003 | Ando et al. ................... 386/68 |
| 6,647,504 B1 | * | 11/2003 | Van Paepegem ............ 713/400 |
| 6,658,519 B1 | * | 12/2003 | Broberg et al. ............. 710/311 |

\* cited by examiner

*Primary Examiner*—Douglas Olms
*Assistant Examiner*—Van Nguyen
(74) *Attorney, Agent, or Firm*—Finnegan, Henderson, Farabow, Garrett & Dunner, L.L.P.

(57) ABSTRACT

This invention enables the digital broadcast receiving section to restore the reception timing even in a system incapable of guaranteeing the real-time feature of digital broadcast data as far as the 1394 Link. The digital broadcast signal received by the RF section and tuner section is restored to ATM cells at the packeting section. The ATM cells are then sent to the time stamp adding section, which adds the arrival time to the ATM cells. The CPU extracts, as a time stamp, the arrival time of the first ATM cell in each transport packet and creates a 4-byte source packet header on the basis of the value of the arrival time and the value of the CTR in the 1394 Link.

23 Claims, 7 Drawing Sheets

TRANSPORT STREAM (ATM CELL) FORMAT

TRANSPORT PACKET FORMAT (FORMAT SENT FROM DEMULTIPLEXING SECTION TO OUTPUT CONTROL SECTION)

TRANSPORT PACKET FORMAT (FORMAT OUTPUTTED FROM 1394 LINK)

DATA PROCESSING SYSTEM AND TIME STAMP CREATING METHOD

CROSS-REFERENCE TO RELATED APPLICATIONS

This application is based upon and claims the benefit of priority from the prior Japanese Patent Application No. 11-201969, filed Jul. 15, 1999, the entire contents of which are incorporated herein by reference.

BACKGROUND OF THE INVENTION

This invention relates to a data processing system for handling digital data, such as digital broadcast programs, and a time stamp creating method used in the system.

With the recent advancement in computer technology, various multimedia-compatible electronic apparatuses have been developed. They include digital videoplayers, set-top boxes, digital TVs, digital Video Cassette Recorders (VCRs), and personal computers. This type of electronic equipment can deal with various types of audio/video data supplied by satellite broadcasting or the like. The audio/video data are encoded by a moving-picture high-efficient coding scheme called Moving Picture Experts Group 2 (MPEG 2). Thereafter, the encoded data are transmitted to each home in the form of digital data streams known as transport streams.

To decode and reproduce the digital data streams transmitted in real time from a broadcasting station, it is necessary to synchronize the system clock of the decoder on the reception side with the system clock on the transmission side by using the Program Clock Reference (PCR) included as a synchronizing reference clock in the digital data streams. The reason for this is that all the presentation timing and decode timing of audio/video data are controlled on the basis of the system clock to prevent a time lag between the system clock on the transmission side and that on the reception side and such a time lag would cause the display to be distorted or the buffer on the decoder side to undergo overflow or underflow.

In the case of a receiving device where a tuner section for receiving the digital data streams from a broadcasting, station and a decoder section are placed in the same set, the clock system of the decoder can be corrected with relative ease. The reason for this is that the PCR included in the digital stream data is transmitted periodically such that the PCR can be transmitted from the tuner section to the decoder section without delay.

A problem arises when the received digital stream data is sent to the decoder by way of an IEEE 1394 serial bus. The IEEE 1394 serial bus has a transfer mode guaranteeing real-time features known as isochronous transfer and can transfer transport packets in real time. Even when the isochronous transfer is used, jitters cause a difference in transmission delay between the transport packets. If the difference in transmission delay causes variations in the arrival time of the PCRs, this leads to fluctuations in the system clock on the decoder side, which prevents the system clock on the decoder side from being synchronized with the system clock on the broadcasting station side.

The standard to solve the problem is IEC 61883. IEC 16883 specifies a time stamp called a source packet header (SPH) to be added to a transport packet and then transmitted. In the 1394 Link on the transmission side, the time a transport packet to be transmitted has arrived is inserted into the source packet header and then transmitted. In the 1394 Link on the reception side, the timing of the transport packet on the transmission side is restored using a timing adjusting circuit (pacer) specified by IEC 61883. That is, when the tuner is connected to the decoder via a 1394 serial bus at the 1394 Link provided in the tuner, a time stamp is added to a transport packet and then the resulting packet is sent to the decoder, which makes it possible to restore, on the decoder side, the timing of the packet transmitted from the broadcasting station and received by the tuner.

However, when a tuner for digital satellite broadcasting is implemented in a personal computer (PC), the following problem arises.

In the PC, the digital data streams received by the tuner are usually transferred to the 1394 Link via the CPU. In this case, the digital data streams received by the tuner have to be passed through the internal bus (Peripheral Component Interface (PCI) bus and others) once. The present PC architecture, however, has no mechanism for guaranteeing real-time transactions or the like on the internal bus. Therefore, it is impossible to transfer the received data to the 1394 Link, while keeping the timing of the digital data streams from the broadcasting station received by the tuner.

In this case, the time the transport packet arrives at the 1394 Link in the PC varies significantly from packet to packet. Thus, even if a source packet header is added to the transport packet at the 1394 Link and transmitted to the decoder on the 1394 serial bus, it is utterly impossible to restore, on the decoder side, the timing of the data transmitted from the broadcasting station.

Generally, an IEC 61883 timing adjusting circuit is not provided in the 1394 Link for the PC. For this reason, it is difficult for the PC to restore the timing of the digital data streams sent by way of the 1394 serial bus. This becomes a problem when the digital data streams recorded in a storage medium are transmitted again via the 1394 serial bus to the decoder, after the digital data streams sent via the 1394 serial bus have been recorded in the storage medium of the PC.

In other words, when the digital data streams are recorded in the storage medium, a process is needed in which the arrival time of the transport packets whose timing has been adjusted by the pacer are recorded together with the transport packets in the storage medium, and on reproduction, a source packet header is generated using the recorded arrival time.

Because the PC has no pacer as described above, it is impossible to restore the timing of the received transport packets exactly. Consequently, the exact arrival time of the transport packets cannot be recorded, therefore, even if the transport packets have been recorded., it is impossible to send them properly via the 1394 serial bus.

BRIEF SUMMARY OF THE INVENTION

It is, accordingly, an object of the present invention to provide a data processing system and a time stamp creating method which enable a correct time stamp to be always created even in a system without a mechanism for guaranteeing real-time features, such as a PC, and are suitable for the processing of audio/video data required to have real-time features.

The foregoing object is accomplished by providing a data processing system for adding a time stamp to compensate for the corresponding transmission delay difference to each of transmission packets constituting a digital data stream to be transmitted to an external node and for transmitting the resulting packets, the data processing system comprising: an internal bus; digital data receiving means connected to the internal bus and for adding time information indicating the corresponding reception time to each of the packets constituting a digital data stream externally received and for outputting the resulting packets onto the internal bus; and means connected to the internal bus for receiving packets to which the time information has been added and for creating a time stamp to be added to a transmission packet to be transmitted to the external node on the basis of the time information in each of the packets received.

In the data processing system, when digital stream data transmitted from a broadcasting station or the like is received, the receiving means adds time information indicating the corresponding reception time to each of the packets constituting the received digital data stream and then outputs the resulting packets onto the internal bus. Because the receiving means adds the reception time to each packet before outputting them onto the internal bus, the reception side that receives the digital data stream from the receiving means via the internal bus can know the timing of the digital stream data from the broadcasting station received by the receiving means. Thus, on the basis of the reception time difference between the packets obtained from the time information in each packet received from the receiving means, the reception side can create the correct time stamp. Therefore, by adding the created time stamp to transmission packets and transmitting the resulting packets to an external node, such as a decoder, the digital data stream can be decoded and reproduced correctly.

It is desirable that means for clocking the same time as that at the external node by periodic time adjustment with the external node should be used to create a time stamp.

It is also desirable that the time stamp creating means, in the case of a first transmission packet in the digital data stream, should read the current time from the clocking means and determine a time stamp to be added to the first transmission packet on the basis of the current time read, and in the case of each of the subsequent transmission packets, should determine a time stamp to be added to each of the subsequent transmission packets by adding the difference between the time information added to each packet and the time information in the first transmission packet to the value of the time stamp added to the first transmission packet. In this case, because the current time from the clocking means should be referred only for the first packet, even if the clocking means must be accessed via the internal bus, the correct time stamp synchronizing with the external node can be created without increasing the traffic on the internal bus.

Furthermore, it is desirable that the receiving means should add the reception time to each of the ATM cells, the minimum units of packets for transmitting a digital data stream. It is also desirable that the time stamp creating means should assemble a transport packet used as a transmission packet by grouping the ATM cells in units of a predetermined number of cells, detect the time information added to the first ATM cell in each of assembled transport packets, and create a time stamp according to the detected time information in each transport packet.

Thus, in a system that extracts a necessary one program of digital streams from those onto which data of multiple programs have been multiplexed and transmits the extracted ones to the external node, even when any program is required, the correct time information corresponding to the transport packet of the program can be obtained. This makes it possible to create the correct time stamp from the time information.

According to another aspect of the present invention, there is provided a data processing system comprising: an internal bus; digital data receiving means connected to the internal bus for receiving a digital data stream onto which data of plural programs have been multiplexed, for adding time information indicating the corresponding reception time to each of the packets constituting the digital data stream received, and for outputting the resulting packets onto the internal bus; separating means connected to the internal bus for extracting digital data streams for one predetermined program from those received via the internal bus and for creating a time stamp indicating the corresponding reception time at the receiving means of each of the transmission packets constituting the digital data streams for one predetermined program on the basis of the time information in each packet; and means connected to the internal bus for adding the corresponding time stamp to each of the transmission packets constituting the digital data streams for one predetermined program and for transmitting the resulting packets to an external node on the basis of the output from the separating means.

The creation of a time stamp at the separating means enables even transmitting means without a time creating function to transmit a transmission packet with the correct time stamp to the external node.

According to still another aspect of the present invention, there is provided a data processing system for adding a time stamp to compensate for the corresponding transmission delay difference to each of transmission packets constituting a digital data stream and for transmitting the resulting packets, the data processing system comprising: means for converting the value of the time stamp added to each of the transmission packets received from an external node so that the value of the time stamp may adapt for a reference clock necessary for reproduction of the digital data stream, on the basis of the ratio of a reference clock used to create the time stamp to the reference clock necessary for reproduction of the digital data stream; and means for recording the converted value of the time stamp as information on the arrival time of the transmission packet into a storage medium in such a manner that the converted value corresponds to the transmission packet.

In this way, the value of the time stamp added to each of the transmission packets received from the external node is converted so that the value of the time stamp may adapt for the reference clock necessary for reproduction of the digital data stream, and the converted value is recorded as arrival time information together with the transmission packet. This enables a system without a timing adjusting circuit to add the correct time stamp to the recorded digital data stream and send the resulting stream to the external node.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Referring to the accompanying drawings, an embodiment of the present invention will be explained.

Figure 1:
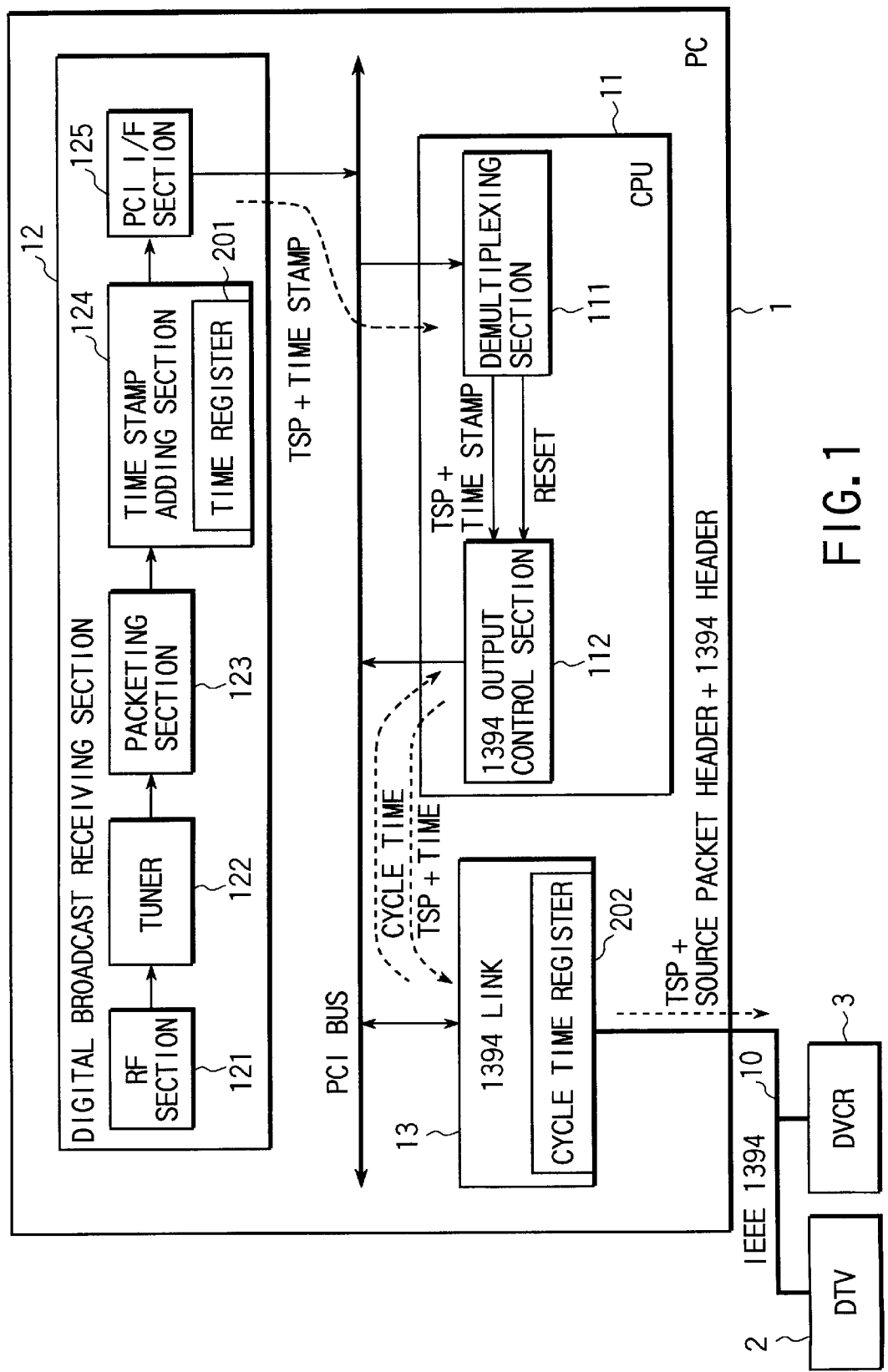
FIG. 1 is a block diagram showing a system configuration of a personal computer according to an embodiment of the present invention.

FIG. 1 shows the system configuration of a personal computer (PC) according to an embodiment of the present invention. The personal computer (PC) 1 has the function of receiving a digital broadcast and forwarding the received data via an IEEE 1394 serial bus 10 to an external 1394 node, such as a digital TV 2 or a digital VCR 3. As shown in FIG. 1, the PC 1 includes a CPU 11, a digital broadcast receiving section 12, and a 1394 interface section (1394 Link) 13. The CPU 11, digital broadcast receiving section 12, and 1394 interface section 13 are connected to a PCI bus 15 serving as an internal bus in the PC 1. The data exchange between those devices is carried out via the PCI bus 15.

The CPU 11 controls the entire operation of the PC 1 and executes an operating system and various types of application programs. In the embodiment, the CPU 11 executes the software that carries out a demultiplexing process of extracting one requested program of transport streams from a plurality of programs multiplexed in transport streams received by the digital broadcast receiving section 12.

The software includes a demultiplexing section 111 and a 1394 output control section 112. The demultiplexing section 111 processes the transport streams received from the digital broadcast receiving section 12 via the PCI bus 15. The 1394 output control section 112 causes the 1394 interface section 13 to transmit packets conformed to the IEC 61883 standard. When a processor (or a media processor) dedicated for multimedia data processing is provided in the PC 1, the functions of the demultiplexing section 111 and 1394 output control section 112 may be realized by using the media processor.

The digital broadcast receiving section 12 is a receiving device for digital satellite broadcasting and receives the transport streams transmitted from the broadcasting station in the form of digital broadcasting signals. In the embodiment, the digital broadcast receiving section 12 has the function of adding time information indicating the corresponding reception time to each of the packets constituting the received digital data streams and outputting the resulting packets onto the PCI bus 15. Since the digital broadcast transport streams are mapped onto ATM cells and broadcast, at the digital broadcast receiving section 12 a time stamp is added to each of the ATM cells received.

To realize such a time stamp adding function, the digital broadcast receiving section 12 includes a packeting section 123 and a time stamp adding section 124 between an RF section 121 and a tuner section 122 that receive a digital broadcast signal and a PCI interface section 125 for outputting the received data onto the PCI bus 15 as shown in FIG. 1. At the packeting section 123 ATM cells are restored by segmenting the received digital broadcast signal in a predetermined data length unit. At the time stamp adding section 124, a time stamp indicating an ATM receiving time is added to each ATM cell.

The 1394 interface section 13 communicates with an external 1394 node, such as a digital TV 2 or a digital VCR 3, via an IEEE 1394 serial bus 10. Isochronous transfer is used in transmitting the transport streams received by the digital broadcast receiving section 12, via the IEEE 1394 serial bus 10. The 1394 interface section 13 has a timer function of clocking the same time as that of the external node by making periodic adjustments to the external node on the basis of a reference clock (24.476 MHz). The time is indicated by a cycle time register (CTR) 202.

The cycle time register 202 is a register specified by the 1394 standard. The cycle start packet containing the time adjustment information is broadcast periodically from the root node serving as a cycle master to all the other 1394 nodes. In the present invention, the PC 1 has the function of the root node. The time in the cycle register 202 at each node is corrected, so that the values of the cycle time registers at all the nodes are synchronous with the reference clock at the root node.

Receiving Digital Broadcast and Transmitting it onto 1394 Serial Bus 10.

Figure 2A:
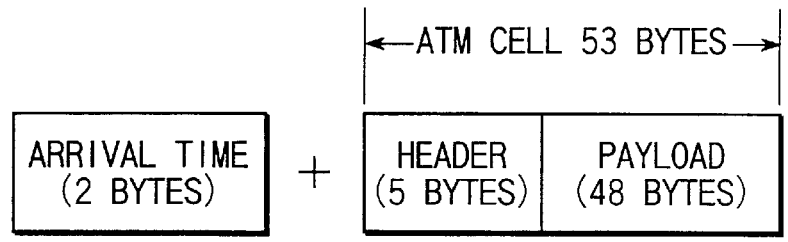
FIGS. 2A to 2C show formats of digital data streams dealt with by the system of the embodiment.
Figure 2B:
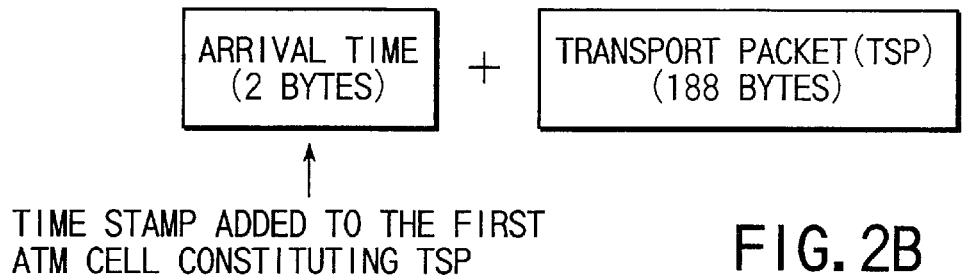
Figure 2C:
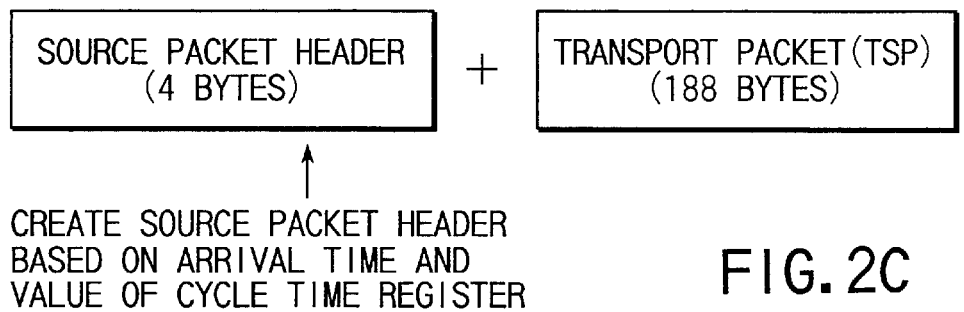
Figure 3:
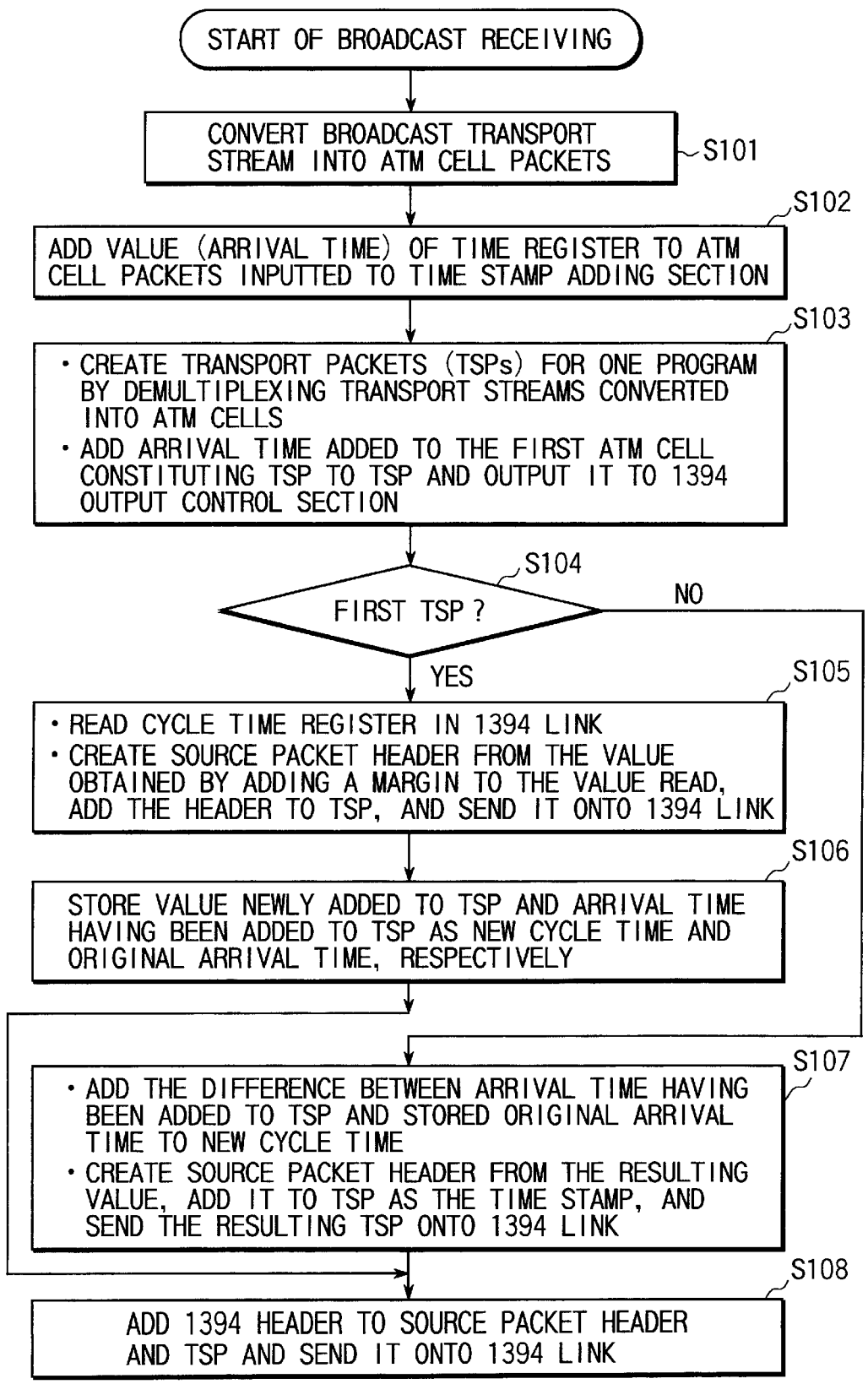
FIG. 3 is a flowchart to indicate the procedure for the process of receiving and transmitting digital data streams executed in the system of the embodiment.

Referring to FIGS. 2A to 2C and FIG. 3, a series of processes will be explained wherein the digital broadcast received by the PC 1 is transmitted to the digital TV 2 on the IEEE 1394 serial bus 10 and the digital TV 2 decodes and reproduces the signal. FIGS. 2A to 2C show the packet formats used in the embodiment and FIG. 3 shows the procedure for the transmitting process.

In digital broadcasting, a plurality of program data are generally multiplexed onto a single transport stream and transmitted. In this case, the transport stream comprises a plurality of transport packets (TSPs). Each transport packet has a fixed length of 188 bytes and is mapped onto a plurality of ATM cells and transmitted. The data size of an ATM cell, which is the smallest unit of transmission packets, has a fixed length of 53 bytes.

In the PC 1, the transport stream flows over the PCI bus 15 once, the real-time feature will be lost. However, when the 1394 interface section 13 transmits data to the digital TV 2, it has to transmit the data with the same timing as that with which the digital broadcast receiving section 12 received the transport stream. To realize this, the present embodiment employs a configuration that causes the time stamp adding section 124 in the digital broadcast receiving section 12 to add the corresponding packet arrival time to each ATM cell as a time stamp before the real-time feature has been lost.

Specifically, after the packeting section 123 has restored the digital broadcast signal received by the RF section 121 and tuner section 122 to ATM cells (step S101), the ATM cells are sent to the time stamp adding section 124, which adds the corresponding arrival time to each of the ATM cells (step S102). The value of a 2-byte time register 201 provided in the time stamp adding section 124 is used as the arrival time. The time register 201 reads the value of a timer that is operated by a reference clock having a frequency of 27 MHz, the same frequency as that of the system clock specified by MPEG 2. Since the value of the time register 201 is corrected by the PCR included in the digital broadcast signal, the arrival time measured with the timing of the same clock as the system clock of the broadcasting station is added to each ATM cell. FIG. 2A shows the format of an ATM cell outputted from the time stamp adding section 124.

As shown in FIG. 2A, an ATM cell includes a 5-byte header section and a 48-byte payload. A 2-byte arrival time is added as a time stamp to the ATM cell.

The transport packet where a time stamp has been added to each ATM cell is sent to the CPU 11 via the PCI bus 15. The demultiplexing section 111, which is software executed by the CPU 11, performs a demultiplexing process for extracting one program of transport streams and creates transport packets for only a specific single program designated by the user. This is the process of converting the TSPs for programs into a TSP for a single program. The process is executed according to the MPEG-2 standard (step S103).

In this case, the value of the corresponding arrival time is added to each transport packet constituting a single program. Specifically, since each transport packet comprises a combination of ATM cells, the demultiplexing section 111, as shown in FIG. 2B, adds the arrival time added as a time stamp to the first ATM cell constituting the transport packet, to the transport packet and transmits the resulting packet to the 1394 output control section 112.

A source packet header has to be added to the transport packet, before it is sent to the digital TV 2 on the IEEE 1394 serial bus 10. According to the IEC-61883 standard, the value (standard) of the cycle time register on arrival at the 1394 Link plus a specific margin (maximum delay time) is to be put in the source packet header. Although a 1394 Link for home use is provided with a pacer for adding a source packet header in hardware, the 1394 Link 13 for PC does not have such a hardware unit. Therefore, it has to emulate the operation of the pacer in software. In the embodiment, the 1394 output control section 112 executes the emulation.

Specifically, on the basis of the value of the arrival time added to the transport packet and outputted from the demultiplexing section 111 and the value in the cycle time register 202 within the 1394 Link 13, the 1394 output control section 112 creates a 4-byte source packet header and adds it to the transport packet as shown in FIG. 2C and then passes the resulting packet to the 1394 Link 13. The source packet header is created as follows.

When receiving the first transport packet (YES at step S104), the 1394 output control section 112 reads the cycle time register 202 in the 1394 Link 13, adds a specific margin (the maximum delay time for transmitting the channel-selected program via the 1394) to the value of the cycle time register 202 to create a source packet header, adds the source packet header as a time stamp to the first transport packet, and sends the resulting packet to the 1394 Link 13 (step S105). The maximum delay time can be estimated from the data transfer rate used in isochronous transfer.

The time stamp (arrival time) originally added to the first transport packet is called Original Arrival Time (OAT) and a newly added time stamp is called New Cycle Time (NCT). They are stored in the 1394 output control section 112 (step S106).

As for the second and subsequent transport packets, the 1394 output control section 112 adds the difference between the arrival time included in each of those packets and the stored OAT to the NCT, creates a source packet header from the result of the addition, adds the header as a time stamp to the corresponding transport packet, and sends the resulting packet to the 1394 Link 13 (step S107).

The 1394 Link 13 adds the 1394 header to the received source packet header and transport packet and sends it onto the IEEE 1394 bus (step S108).

As described above, before the received digital data stream has been outputted onto the PCI bus 15, the arrival time is added to each ATM cell constituting the data stream. Thus, it is possible to restore the reception timing at the digital broadcast receiving section 12, even after the data has been transferred via the PCI bus 15. As a result, the transport packet to which the correct source packet header has been added can be transmitted from the 1394 Link 13 to the digital TV 2. This makes it possible to transmit, to the digital TV 2 at the other party, information on the arrival time of each transport packet clocked at 27 MHZ as the frequency of the MPEG-2 reference clock, using the time stamp clocked at the reference clock (24.576 MHZ) of the 1394 Link.

When the value of the source packet header in the transport packet matches with the CTR, the digital TV 2 sends the transport packet to a decoder under the control of the pacer. This removes jitters on the 1394 serial bus 10 and enables the packet reception timing at the digital broadcast receiving section 12 on the transmission side to be reproduced on the digital TV 2, which makes it possible to cause the system clock of the decoder in the digital TV 2 to synchronize with the system clock on the broadcasting station side correctly by using the PCR included in the MPEG-2 digital data stream. Thus, the digital broadcast program can be reproduced correctly without such problems as the distortion of the display and the overflow or underflow of the buffer provided on the decoder side.

Storing Digital Broadcasts Received via the 1394 Serial Bus 10.

The process in which the transport packets transmitted via the 1394 serial bus 10 is received by the PC and recorded will be explained.

Figure 4:
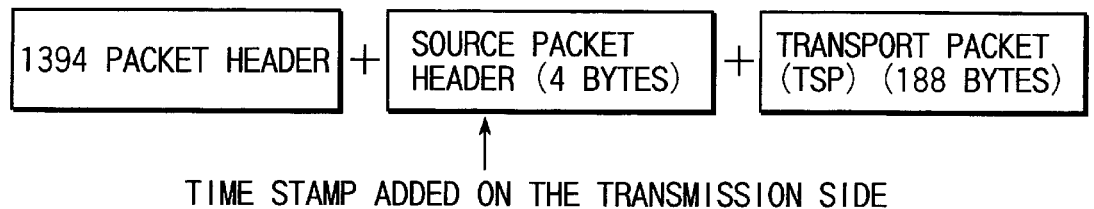
FIG. 4 shows the format of a digital data stream that the system of the embodiment receives from an external node.

FIG. 4 shows the format of a transport packet transmitted from the digital broadcast receiving section via the 1394 serial bus 10 to the PC 1. As shown in FIG. 4, a source packet header created on the basis of a reference clock of 24.576 MHz at the 1394 Link on the transmission side is added to the transport packet.

Since the 1394 Link 13 of the PC 1 in the embodiment does not have a pacer, it cannot restore the time at which the packet has arrived at the transmission-side 1394 Link. In the case of a system with a pacer, the correct arrival time adjusted in timing by the pacer can be stored into the storage medium together with the transport packet. When the transport packet is transmitted via the 1394 serial bus 10 to an external node, the correct source packet header can be created on the basis of the recorded arrival time. On the contrary, a PC 1 without a pacer cannot perform such control.

In the embodiment, an arrival time to be recorded together with the transport packet in the storage medium is created using the value of the source packet header added on the transmission side to remove jitters on the 1394 Link, instead of adjusting the transport packet in timing. In this case, since a reference clock of the time stamp included in the source packet header has a frequency of 24.576 MHz and a reference clock needed to reproduce the MPEG-2 digital data stream has a frequency of 27 MHz, the value of the time stamp included in the source packet header is converted into the value that would be obtained when the time stamp is clocked at 27 MHz. The value after the conversion is recorded as the arrival time, together with the transport packet, in the storage medium.

Hereinafter, referring to FIG. 5, a configuration of the system of the embodiment will be explained.

Figure 5:
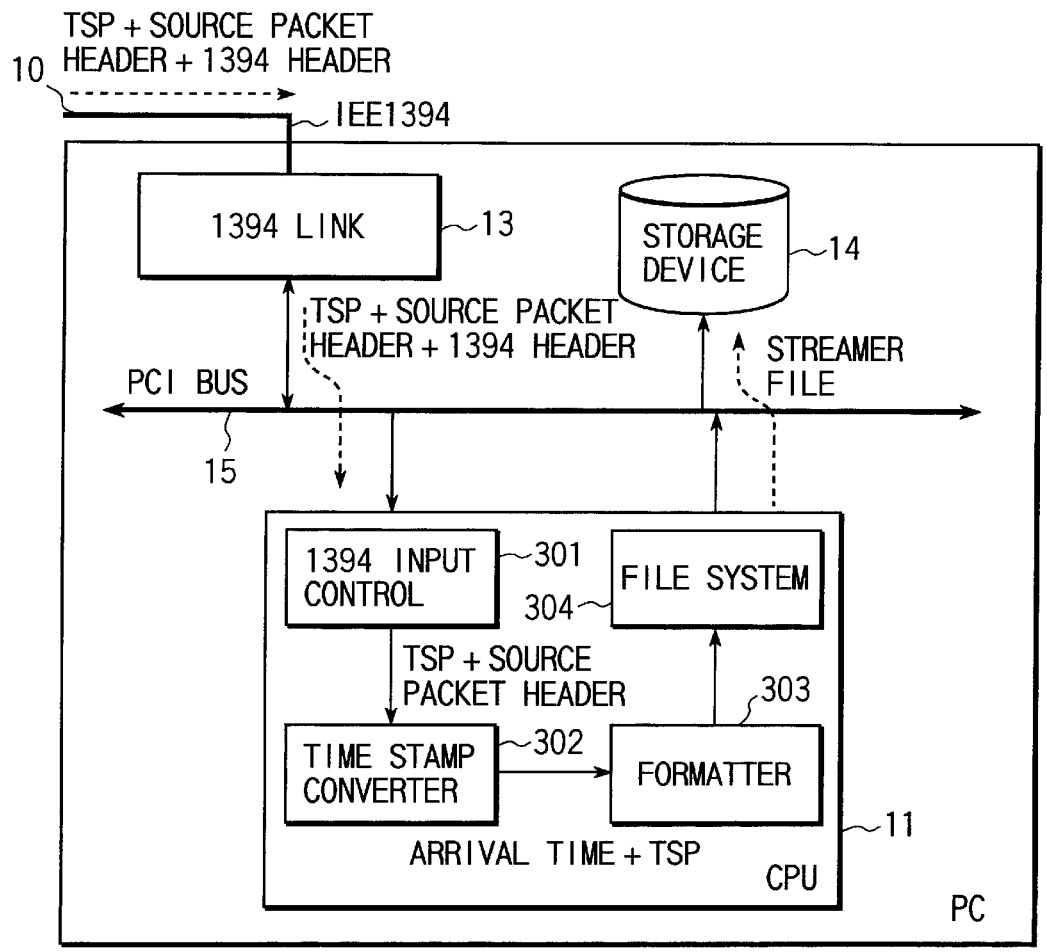
FIG. 5 is a block diagram showing the functional configuration for carrying out the process of recording the digital data streams received from the external node into a storage medium in the system of the embodiment.

As shown in FIG. 5, the PC 1 includes the CPU 11, the 1394 Link 13, and a storage device 14. The storage device 14 is a storage medium, such as a hard disk or a DVD-RAM. The transport packet sent via the 1394 serial bus 10 is recorded together with information on its arrival time in the storage medium. The recording control of the transport packet and arrival time information is performed by a 1394 input control section 301, a time stamp converter section 302, a formatter 303, and a file system 304. All the 1394 input control section 301, the time stamp converter section 302, the formatter 303, and the file system 304 are software executed by the CPU 11.

Figure 6:
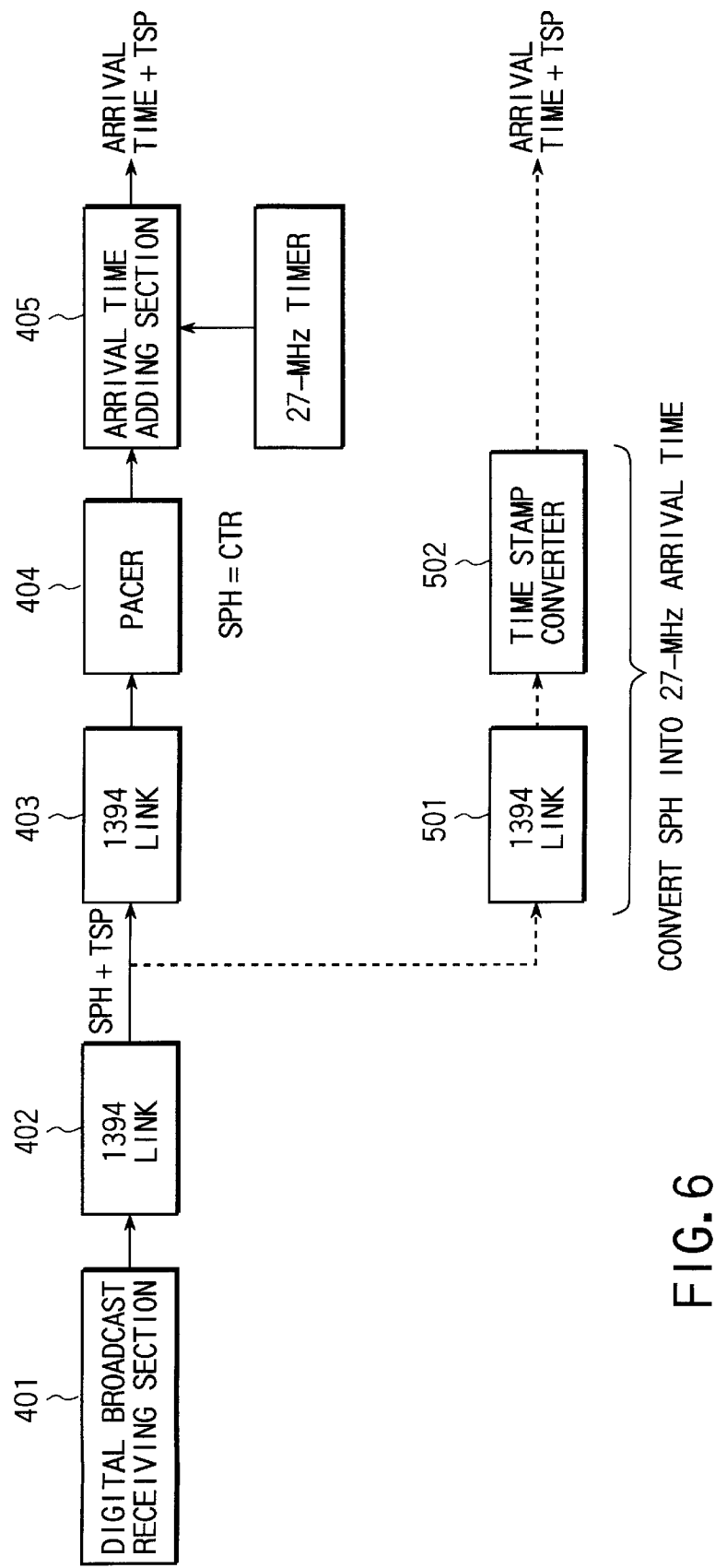
FIG. 6 is a diagram to explain the principle of the recording process used in the embodiment.

Referring to FIG. 6, the principle of the recording control executed in software will be explained.

The digital broadcast receiving section 401 adds the arrival time clocked at the 27-MHz reference clock to the transport packet and sends the resulting packet to the 1394 Link 402. The 1394 Link 402 rewrites the arrival time clocked at 27 MHz to the arrival time clocked at 24.576 MHz, which is the reference clock of the source packet header, and adds the resulting arrival time as a source packet header to the transport packet, and thereafter outputs the resulting packet onto the 1394 serial bus 10.

When the system on the reception side has a pacer, as shown by the solid lines, the transport packet with the source packet header is sent via a 1394 Link 403 to a pacer 404. The pacer 404 causes each transport packet to wait for the value of the CTR to match with the value designated in the source packet header. This removes jitters caused by the packets passing over the 1394 serial bus 10, which enables the transport packet to be sent to an arrival time adding section 405 with the same timing as that of the packet reception at the digital broadcast receiving section 401.

The arrival time adding section 405 adds an arrival time to the transport packet using a system timer that operates on the MPEG-2 clock (27 MHz). As described above, the system with a pacer renews a time stamp on the basis of the packet reception timing at the digital broadcast receiving section 401 restored by the pacer, adds the arrival time clocked at the MPEG-2 reference clock (27 MHz) to the transport packet, and records the resulting packet into the storage medium.

On the other hand, in the embodiment, the transport packet with the source packet header is received by a 1394 Link 501 and then sent directly to a time stamp converter section 502 without timing adjustment as shown by the doted lines. The time stamp converter section 502 rewrites the value of the source packet header clocked at 24,576 MHz to a value clocked at the MPEG-2 reference clock (27 MHz), adds the resulting value as the aforementioned arrival time to the transport packet, and records the resulting packet into the storage medium.

A value of the time stamp included in the source packet header is obtained by rewriting a value of the packet arrival time originally added on the basis of the 27-MHz reference clock in the digital broadcast receiving section 401 with a value of the packet arrival time clocked at 24,576 MHz within the 1394 Link 402 on the transmission side. Thus, when the 1394 Link 501 on the reception side rewrites the received time stamp with a time stamp clocked at 27 MHz again and records it as the arrival time, thereby transmitting the recorded transport packet via the 1394 serial bus 10 to an external node, the arrival time of each packet at the digital broadcast receiving section 401 can be restored on the basis of the recorded arrival time information, although there is a little effect of jitters on the 1394 serial bus 10. By creating the source packet header using the recorded arrival time information, it is possible to transmit the packet reception timing at the digital broadcast receiving section 401 to the 1394 node at the destination.

Figure 7:
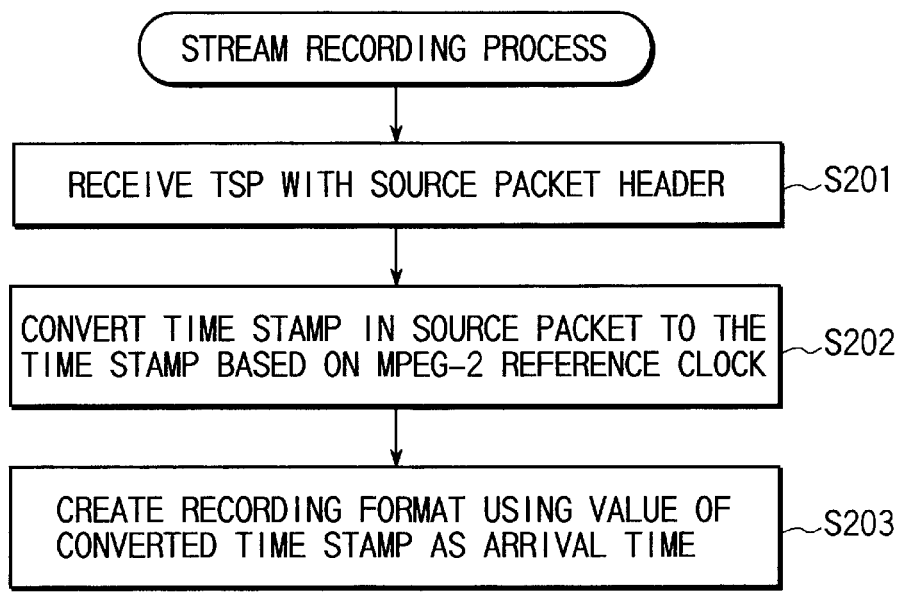
FIG. 7 is a flowchart to indicate the procedure for the recording process used in the embodiment.

Hereinafter, referring to the flowchart of FIG. 7, the operation -of the system in FIG. 5 will be explained.

The 1394 Link 13 receives a TSP to which a source packet header and a 1394 header have been added and passes it to the 1394 input control section 301 (step S201). The 1394 input control section 301 processes a 1394 packet and removes the 1394 header. The remaining TSP plus source packet header is sent to the time stamp converter 302.

The time stamp converter 302 converts the value (A) of the time stamp of the source packet header based on the reference clock (24.576 MHz) of the 1394 source packet header to a value based on MPEG2-reference clock (27 MHz) (step S202). The value (B) of the time stamp after the conversion is obtained by multiplying the value (A) of the time stamp in the source packet header by the frequency ratio of the two reference clocks (27 MHz/24.576 MHz) as follows:

$$B=A \cdot (27 \text{ MHz}/24.576 \text{ MHz})$$

The count in the CTR used to create a source packet header is increased by one every (1/24.576 M) second, whereas the counter used to create the arrival time from which the value of the source packet header is created is incremented by one every (1/27 M) second.

Consequently, when the same time is represented, the value (A) of the time stamp in the source packet header using the 24.576-MHz reference clock is smaller than the value of the arrival time using the 27-MHz reference clock. Executing the above calculations enables the time represented by the value (A) of the time stamp to be converted into the count using the 27-MHz reference clock.

The converted value (B) of the time stamp, together with the TSP, is passed to the formatter 303. The formatter 303 uses the value (B) of the time stamp as arrival time and creates a format for digital video recording from the arrival time and TSP (step S203). An example of the format is shown in FIG. 8.

Figure 8:
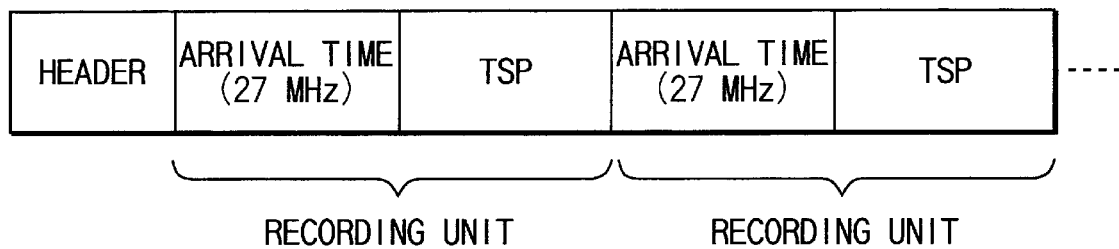
FIG. 8 shows a recording format used in the embodiment.

As shown in FIG. 8, the format for digital video recording includes predetermined header information and pairs of arrival time and TSP following the header information. The formatted data sequence is recorded in the storage device 14 via the file system 304.

Figure 9:
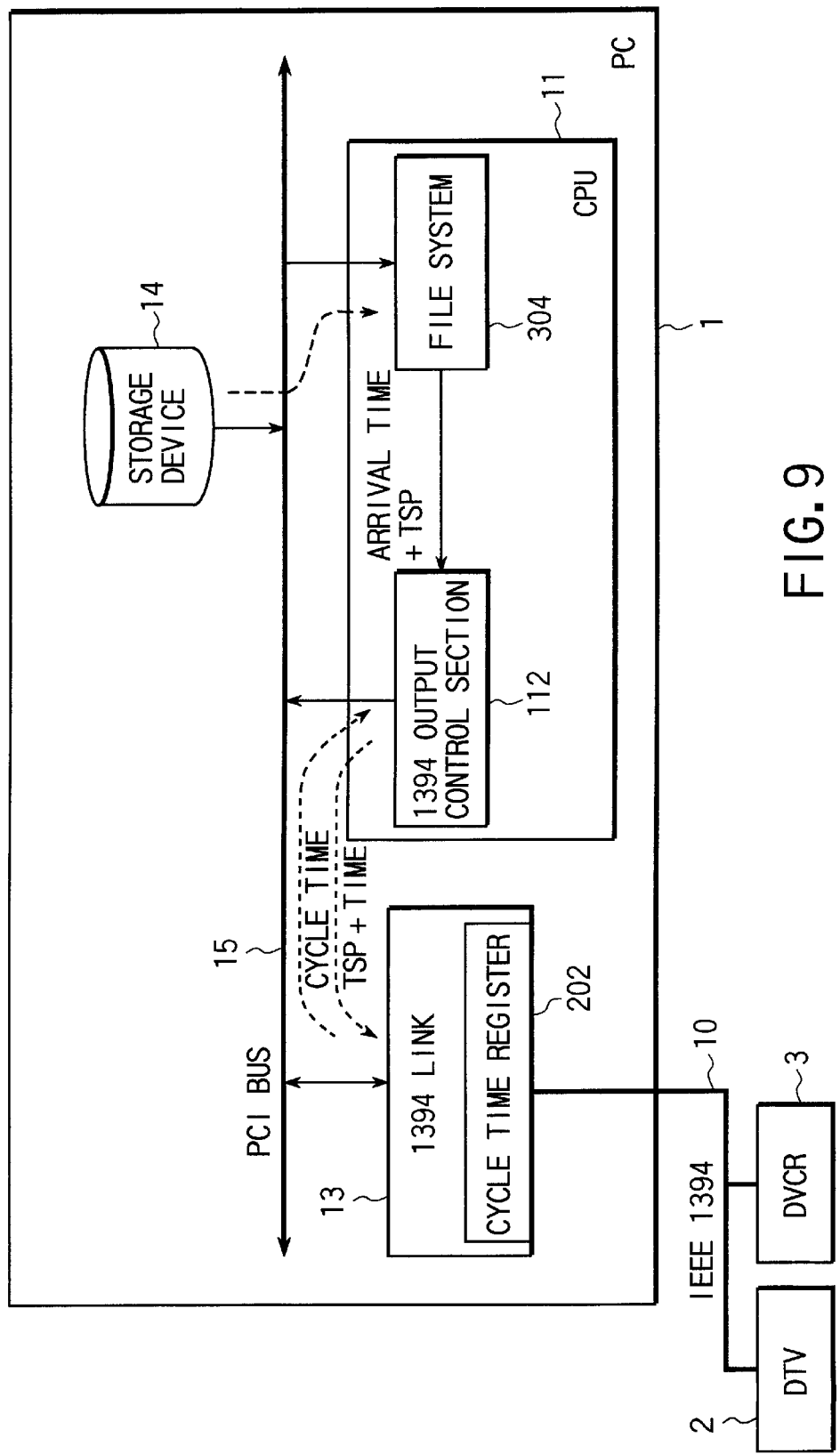
FIG. 9 is a block diagram showing the functional configuration for transmitting the digital data streams recorded in the storage medium in the system of the embodiment to the external node.

Reproducing the Recorded Digital Broadcast Data The Control performed in a case where the digital broadcast data recorded in the storage device 14 is transmitted to the digital TV 2 on the 1394 serial bus and the digital TV 2 reproduces the data will be explained by reference to FIG. 9.

The CPU 11 executes the functions of the 1394 a output control section 112 and file system 304. The file system 304 reads the recorded data sequence from the storage device 14 and transmits the transport packet with the arrival-time to the 1394 output control section 112.

On the receipt of the first transport packet, the 1394 output control section 112 reads the cycle time register 202 in the 1394 Link 13, creates a source packet header by adding a predetermined margin (the maximum delay time) to the value of the cycle time register 202, adds the packet header to the first transport packet as a time stamp, and sends the resulting packet to the 1394 Link 13. Then, the time stamp (arrival time) originally added to the first transport packet is stored as OAT and the newly added time stamp is stored as NCT into the 1394 output control section 112.

As for the second and subsequent transport packets, the 1394 output control section 112 adds the difference between the arrival time added to each of those packets and the stored OAT to the NCT, creates a source packet header from the result of the addition, adds the header as a time stamp to the corresponding transport packet, and sends the resulting packet to the 1394 Link 13.

The 1394 Link 13 adds the 1394 header to the received source packet header and transport packet and sends it onto the IEEE 1394 bus.

Under the control of the pacer, the digital TV 2 sends the transport packet to the decoder, when the value of the source packet header in the transport packet matches with the CTR. As a result, jitters on the 1394 serial bus 10 are removed, enabling the timing designated by the arrival time recorded together with the TSP in the storage device 14 to be reproduced on the digital TV 2. As a result, the system clock of the decoder in the digital TV 2 can be synchronized accurately with the system clock necessary for reproduction of the stream read from the storage device 14 using of the PCR included in the MPEG-2 digital data stream. Thus, the digital broadcast program can be reproduced properly without the distortion of the display or the like.

If the value (A) of the source header were used directly without converting as the arrival time in recording into the storage device 14, the time interval in the digital TV 2 at which TSPs are sent from the pacer to the decoder might be shorter, which leads to a problem, such as fluctuations in the system clock or the distortion of the display.

So far the configuration and operation of the present invention have been explained using the PC as an example. The invention can be applied to any system (e.g., a game machine/digital video player with a built-in tuner or a set-top box) for which real-time features from the digital broadcast receiving section to the 1394 Link cannot be guaranteed. In addition, since the conversion of the time stamp enables the arrival time to be recorded, it is possible to store and read (reproduce) the digital broadcast data in not only the PC but also any other system without a pacer.

Furthermore, the reception of a digital broadcast and the transmission of the digital broadcast onto the 1394 serial bus in the invention and further the storage of the digital broadcast are all controlled in software. Thus, when a recording medium has been prepared on which a computer program including the procedure for the control has been recorded, the same effect as that of the present embodiment can be obtained by just loading the computer program into an ordinary computer via the recording medium.

While the present embodiment has been explained with regard to digital data streams supplied by digital satellite broadcasting, the method of the embodiment is applicable to the reception, transmission, and storage of any audio and video data that need real-time features, such as digital data streams supplied by the CATV.

In addition, the present invention can be applied not only to the 1394 serial bus but also to any transmission path for transmitting packets to which time stamp is added.

Furthermore, the invention is applicable not only to the communication between 1394 nodes but also to the communication between devices in a computer.

As described above, the present invention enables not only a system without a mechanism for guaranteeing real-time features, such as a PC, to create a correct time stamp at all times, but also audio/video data requiring real-time features to be received, transmitted, and stored properly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data processing system for adding a time stamp to compensate for the corresponding transmission delay difference to each of transmission packets constituting a digital data stream to be transmitted to an external node and for transmitting the resulting packets, said data processing system comprising:

an internal bus;

digital data receiving means connected to said internal bus for adding time information indicating the corresponding reception time to each of the packets constituting a digital data stream externally received and for outputting the resulting packets onto said internal bus; and means connected to said internal bus for receiving packets to which said time information has been added and for creating a time stamp to be added to a transmission packet to be transmitted to said external node on the basis of the time information in each of the packets received.

2. The data processing system according to claim 1, further comprising means for clocking the same time as that at the external node by periodic time adjustment with the external node, wherein said time stamp creating means, in the case of a first transmission packet in said digital data stream, reads the current time from said clocking means and determines a time stamp to be added to said first transmission packet on the basis of the current time read, and in the case of each of the subsequent transmission packets, determines a time stamp to be added to each of said subsequent transmission packets by adding the difference between the time information added to each packet and the time information in said first transmission packet to the value of the time stamp added to said first transmission packet.

3. The data processing system according to claim 1, wherein said digital data stream comprises transport streams converted into ATM cells, and said digital data receiving means includes broadcast receiving means for receiving said transport stream converted into ATM cells and transmitted as a digital broadcast signal, means for restoring the ATM cells from the reception signal received by said broadcast receiving means, and means for adding time information indicating the corresponding reception time to each of the restored ATM cells and for outputting the resulting cells onto said internal bus.

4. The data processing system according to claim 3, wherein said time stamp creating means includes means for extracting transport streams for one predetermined program from those received from said digital data receiving means, means for assembling a transport packet used as said transmission packet by grouping the ATM cells constituting the extracted transport stream in units of a predetermined number of cells and for detecting the time information added to the first ATM cell in each of the assembled transport packets, and means for creating a time stamp to be added to each of said transport packets and then transmitted on the basis of the reception time difference between said transport packets obtained from time information detected in each of said transport packet.

5. The data processing system according to claim 1, further comprising means for converting the value of the time stamp added to each of the transmission packets received from the external node so that the value of the time stamp may adapt for a reference clock necessary for reproduction of said digital data stream, on the basis of the ratio of a reference clock used to create said time stamp to the reference clock necessary for reproduction of said digital data stream.

6. The data processing system according to claim 5, further comprising means for recording said converted value of the time stamp as information on the arrival time of said transmission packet into a storage medium in such a manner that the converted value corresponds to said transmission packet.

7. A data processing system comprising:

an internal bus;

digital data receiving means connected to said internal bus, for receiving a digital data stream onto which date of plural programs have been multiplexed, for adding time information indicating the corresponding reception time to each of the packets constituting said digital data stream received, and for outputting the resulting packets onto said internal bus;

separating means connected to said internal bus for extracting digital data streams for one predetermined program from those received via said internal bus and for creating a time stamp indicating the corresponding reception time at said receiving means of each of the transmission packets constituting said digital data streams for one predetermined program on the basis of the time information in each packet; and means connected to said internal bus for adding the corresponding time stamp to each of the transmission packets constituting said digital data streams for one predetermined program and for transmitting the resulting packets to an external node on the basis of the output from said separating means.

8. The data processing system according to claim 7, further comprising means for converting the value of the time stamp added to each of the transmission packets received from the external node so that the value of the time stamp may adapt for a reference clock necessary for reproduction of said digital data stream, on the basis of the ratio of a reference clock used to create said time stamp to the reference clock necessary for reproduction of said digital data stream.

9. The data processing system according to claim 8, further comprising means for recording said converted value of the time stamp as information on the arrival time of said transmission packet into a storage medium in such a manner that the converted value corresponds to said transmission packet.

10. A data processing system for adding a time stamp to compensate for the corresponding transmission delay difference to each of transmission packets constituting a digital data stream and for transmitting the resulting packets, said data processing system comprising:

means for converting the value of the time stamp added to each of the transmission packets received from an external node so that the value of the time stamp may adapt for a reference clock necessary for reproduction of said digital data stream, on the basis of the ratio of a reference clock used to create said time stamp to the reference clock necessary for reproduction of said digital data stream; and means for recording said converted value of the time stamp as information on the arrival time of said transmission packet into a storage medium in such a manner that said converted value corresponds to said transmission packet.

11. The data processing system according to claim 10, further comprising means for creating a time stamp to be added to a transmission packet to be transmitted to the external node, on the basis of the arrival time information recorded together with said transmission packet.

12. A data processing system for recording transmission 1packets constituting a digital data stream into a storage medium in such a manner that the packets correspond to arrival time information indicating the arrival time of the respective packets and, on the basis of said arrival time information, and for creating a time stamp to be added to a transmission packet to be transmitted to an external node, said data processing system comprising:

means for converting the value of the time stamp added to each of the transmission packets received from the external node so that the value of the time stamp may adapt for, a reference clock necessary for reproduction of said digital data stream, on the basis of the ratio of a reference clock used to create said time stamp to the reference clock necessary for reproduction of said digital data stream; and means for recording said converted value of the time stamp as information on the arrival time of said transmission packet into said storage medium in such a manner that the converted value corresponds to said transmission packet.

13. The data processing system according to claim 12, further comprising means for creating a time stamp to be added to a transmission packet to be transmitted to the external node, on the basis of the arrival time information recorded together with said transmission packet.

14. A method of creating a time stamp to be added to each of transmission packets constituting a digital data stream to be transmitted to an external node, said time stamp creating method comprising the steps of:

adding time information indicating the corresponding reception time to each of the packets constituting a digital data stream externally received and outputting the resulting packets onto an internal bus; and receiving packets to which said time information has been added via said internal bus and, on the basis of the reception time difference between said packets obtained from the time information in each of the packets received, creating a time stamp to be added to a transmission packet to be transmitted to said external node.

15. A method of creating a transmission time stamp to be added to each of transmission packets constituting a digital data stream to be transmitted to an external node, said time stamp creating method comprising the steps of:

receiving a digital data stream where a receipt time stamp has been added to each of the transmission packets from the external node;

converting the value of the receipt time stamp added to each of the transmission packets received from said external node so that the value of the receipt time stamp may adapt for a reference clock necessary for reproduction of said digital data stream, on the basis of the ratio of a reference clock used to create said transmission time stamp to the reference clock necessary for reproduction of said digital data stream;

recording the converted value of the time stamp as information on the arrival time of said transmission packet into a storage medium in such a manner that the converted value corresponds to said transmission packet; and creating said transmission time stamp to be added to said transmission packets on the basis of the arrival time information recorded together with said transmission packets, when transmitting a group of transmission packets recorded in said storage medium to the external node.

16. A method comprising the steps of:

receiving a digital data stream where a time stamp has been added to each of the transmission packets from an external node; and converting the value of the time stamp added to each of the transmission packets received from said external node so that the value of the time stamp may adapt for a reference clock necessary for reproduction of said digital data stream, on the basis of the ratio of a reference clock used to create said time stamp to the reference clock necessary for reproduction of said digital data stream.

17. The method according to claim 16, further comprising the step of recording the converted value of the time stamp as information on the arrival time of said transmission packet into a storage medium in such a manner that the converted value corresponds to said transmission packet.

18. The method according to claim 17, further comprising the step of creating said time stamp to be added to said transmission packets on the basis of the arrival time information recorded together with said transmission packets, when transmitting a group of transmission packets recorded in said storage medium to the external node.

19. A data processing system comprising:

digital data receiving means for receiving a digital data stream from the outside, adding time information indicating the corresponding reception time to each of packets constituting said received digital data stream, and outputting the resulting packets; and means for receiving the packets to which said time information has been added from said digital data receiving means and creating a time stamp to be added to transmission packets to be transmitted to another node, on the basis of time information in each of the packets received.

20. The data processing system according to claim 19, further comprising means for converting the value of the time stamp added to each of the transmission packets received from the external node so that the value of the time stamp may adapt for a reference clock necessary for reproduction of said digital data stream, on the basis of the ratio of a reference clock used to create said time stamp to the reference clock necessary for reproduction of said digital data stream.

21. The data processing system according to claim 20, further comprising means for recording said converted value of the time stamp as information on the arrival time of said transmission packet into a storage medium in such a manner that the converted value corresponds to said transmission packet.

22. A data processing system including a plurality of devices connected via an internal bus, comprising:

digital data receiving means for receiving a digital data stream from the outside; and means provided at a device on said internal bus for adding time information indicating the corresponding reception time to each of packets constituting said received digital data stream and outputting the resulting packets to another device on said internal bus.

23. A data processing system comprising:

means for converting the value of a time stamp to be added to each of transmission packets constituting a digital data stream so that the valve of the time stamp may adapt for a reference clock necessary for reproduction of said digital data stream; and means for recording said converted value of the time stamp as information on the arrival time of each of said transmission packets into a storage medium in such a manner that the said converted value corresponds to said transmission packet.

* * * * *

UNITED STATES PATENT AND TRADEMARK OFFICE
CERTIFICATE OF CORRECTION

PATENT NO. : 6,778,537 B1
DATED : August 17, 2004
INVENTOR(S) : Ishibashi

It is certified that error appears in the above-identified patent and that said Letters Patent is hereby corrected as shown below:

Column 13,
Line 33, change "bus,for" to -- bus for --; and

Column 14,
Line 25, change "1packets" to -- packets --.

Signed and Sealed this

Twenty-sixth Day of October, 2004

JON W. DUDAS
*Director of the United States Patent and Trademark Office*